L. C. WETZEL.
WEIGHING SCALE.
APPLICATION FILED MAR. 19, 1913.
1,251,148.
Patented Dec. 25, 1917.
3 SHEETS—SHEET 3.
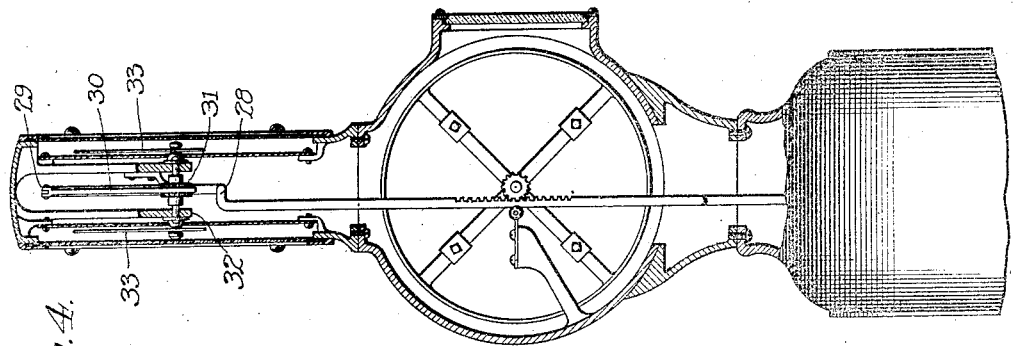
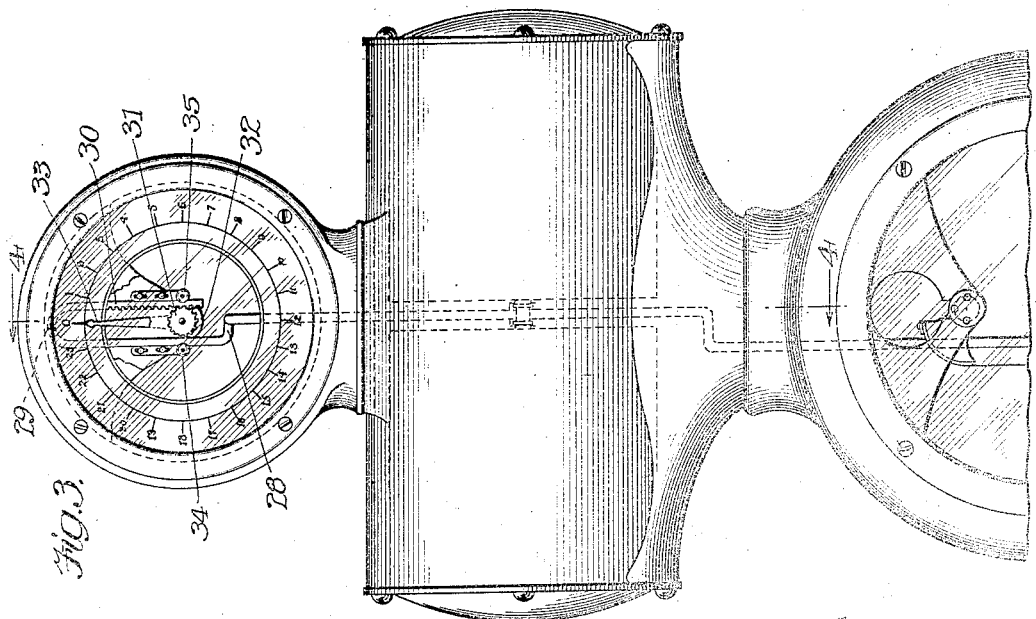
Witnesses
Martin H. Olsen
Robert Dobberman
Inventor
Lewis C. Wetzel

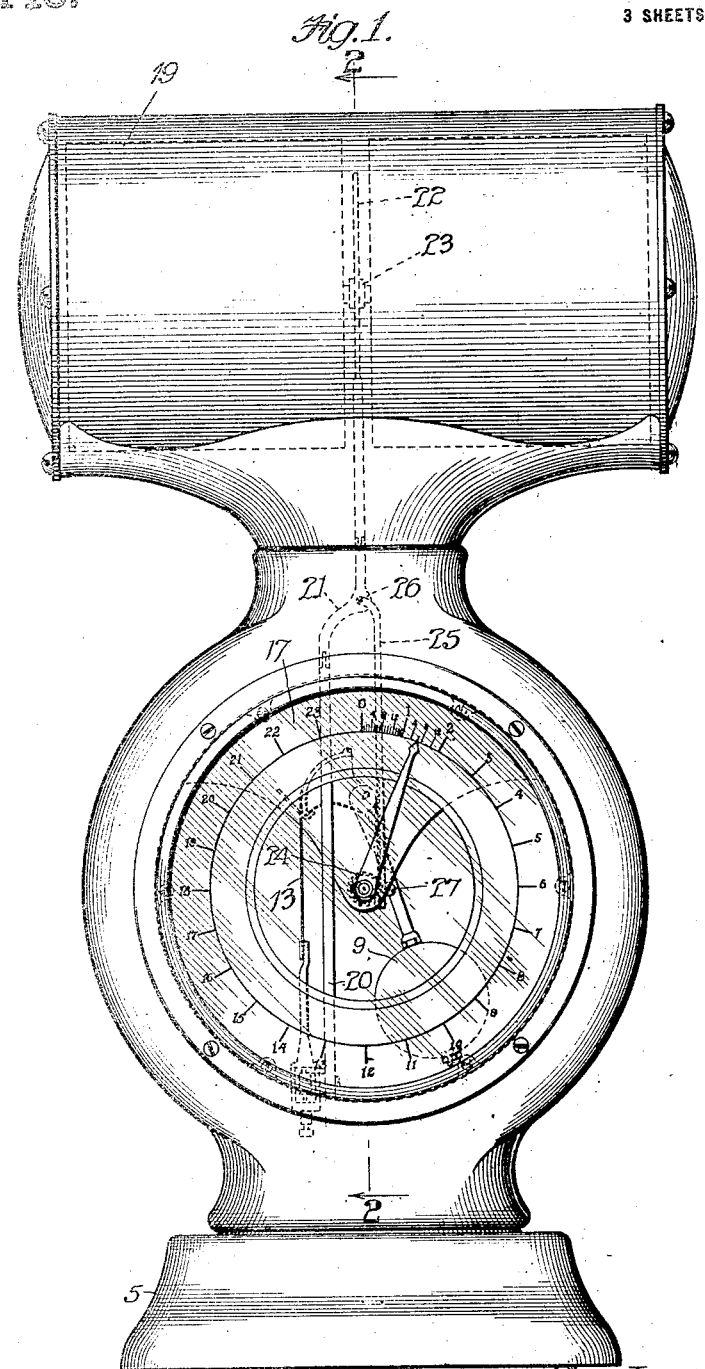

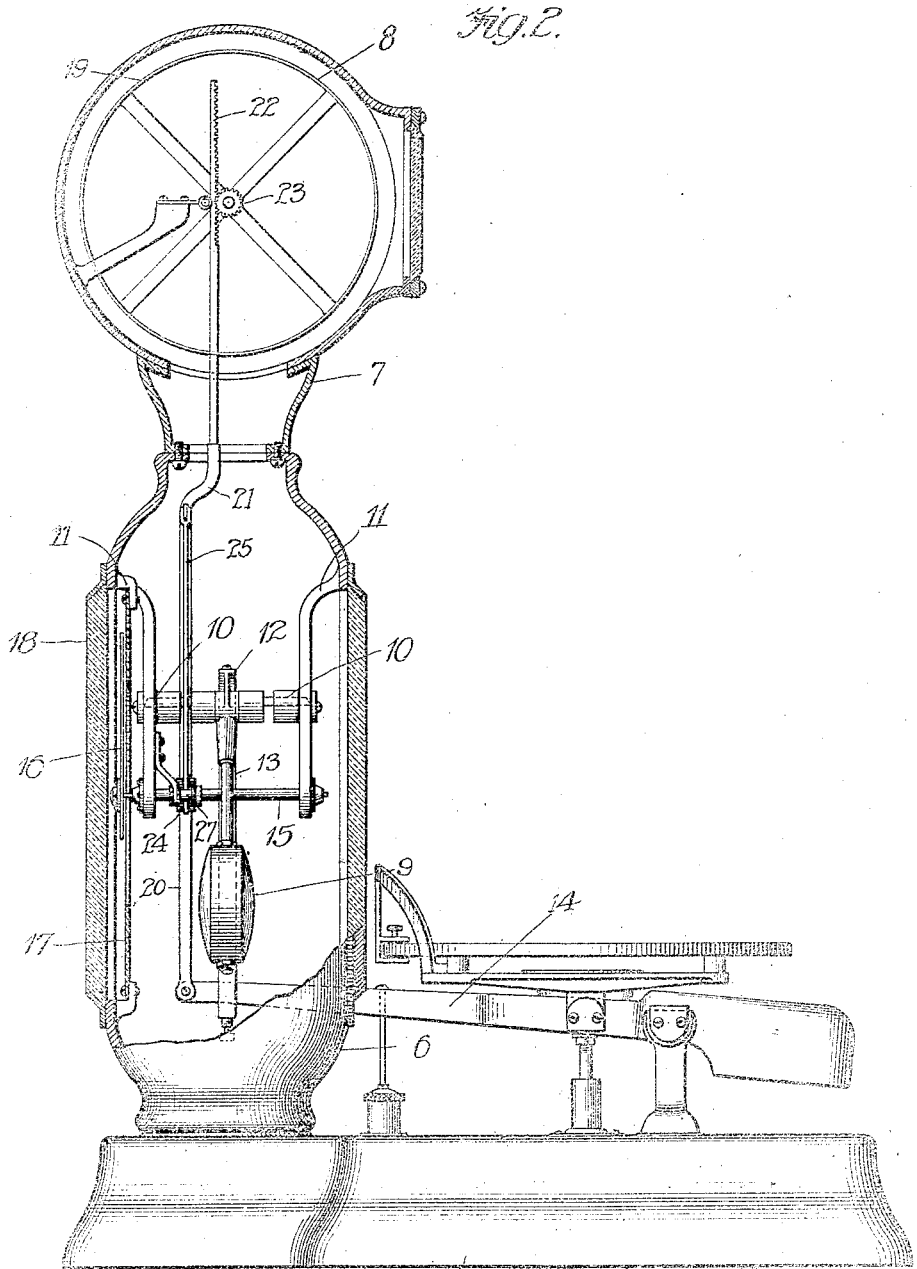

UNITED STATES PATENT OFFICE.

LEWIS CALVIN WETZEL, OF TOLEDO, OHIO, ASSIGNOR, BY MESNE ASSIGNMENTS, TO TOLEDO SCALE COMPANY, OF TOLEDO, OHIO, A CORPORATION OF NEW JERSEY.

WEIGHING-SCALE.

1,251,148.      Specification of Letters Patent.      Patented Dec. 25, 1917.

Application filed March 19, 1913. Serial No. 755,283.

*To all whom it may concern:*

Be it known that I, LEWIS C. WETZEL, a citizen of the United States, residing at Toledo, county of Lucas, and State of Ohio, have invented certain new and useful Improvements in Weighing-Scales, of which the following is a specification.

My invention relates more particularly to automatic computing scales in which the computations or values of various weights at different prices per unit of weight are shown upon a revolving chart or drum. In scales of this character provision has sometimes been made for indicating the weight of the commodity to the purchaser, who ordinarily stands at the back of the scales, by providing a chart with a reversely arranged series of weight indications which are visible to the purchaser or customer through an opening in the casing. To provide for such an indication, however, requires the utilization of considerable space on the computing drum which therefore has to be made correspondingly long and heavy, or else the number of value computations thereon must be very materially reduced. It is the object of my invention to provide a weight indication for the customer which shall not be open to this objection and which may be more readily and easily read by him than the indication referred to above. For this purpose I provide, in addition to the rotary chart or drum, a dial indicator having a hand or pointer which is driven directly from the same rod or connection which drives the drum. The dial is centrally located either above or below the drum and substantially in line with the driving means therefor. When the dial is located beneath the drum, as in my preferred form, it occupies the rear face of the casing which contains the pendulum and mechanism by which it is connected to the lever of the scale.

With this general statement of the purpose and nature of my invention, I shall proceed to describe it in detail with reference to the accompanying drawings, it being understood, however, that the detailed disclosure is for the purpose of exemplification only, my invention not being limited thereto but pointed out in the following claims in which I have endeavored to distinguish it from the prior art so far as known to me without, however, abandoning or relinquishing any portion thereof.

Referring now to the several views of the drawing, Figure 1 is a rear elevation of a scale embodying my preferred form of customer's indicator; Fig. 2, is a side view of the same mainly in vertical section on the line 2—2 of Fig. 1; Figs. 3 and 4 are a rear elevation and vertical section respectively of another form of the invention in which the dial is mounted above the drum casing, Fig. 4 being on the plane of the line 4—4 of Fig. 3. Each part is indexed by the same reference numeral wherever it occurs in the drawing.

The general character of scale to which my invention is applied is so well known as to require no detailed description here. It comprises a base 5 upon which is mounted a watch-shaped housing 6 containing the pendulum and associated parts and supporting, by means of a saddle piece 7, a chart casing 8 containing a cylindrical chart. A pendulum 9 is suspended from bearings 10—10 in the usual manner, the latter being mounted upon brackets 11—11 secured to the housing. A segment 12 is formed integral with or attached to the pendulum structure and connected by a strap 13 with the end of the beam or lever 14 of the scale. The latter is but fragmentarily shown in the drawing but may be of any well known or suitable form and provided with the usual scale pan and associated parts. The brackets 11—11 which support the pendulum bearings are extended below the same to form bearings or supports for a rotary shaft 15 which carries at one end a hand 16 coöperating with a dial 17 at the rear of the housing and visible to the purchaser through a pane 18 of glass covering a sight opening in the housing. The rack rod 20 by which the rotary chart 19 is operated is connected to the lever at a point slightly to one side of the median line of the scale, and above the working parts within the housing is offset to the center of the housing, as at 21, and then extends vertically or substantially so, and supports a rack 22 engaging with a pinion 23 upon the axis of the chart which is centrally divided, as shown. The shaft 15 carrying the indicating hand is provided with a pinion 24 in the plane of the rack rod 20 and a second rack 25 is pivotally suspended from the rack rod at the point 26 and engages said pinion, being held in mesh therewith by an anti-friction roller 27.

In the modification shown in Figs. 3 and 4, as above stated, the dial indicator is mounted above the drum chart and may, if desired, be provided with dials on both sides, and is so shown in the drawing. In this form of the invention the rack rod is extended above the cylindrical chart casing and offset, as at 28, and carried to a point 29 near the top of the dial casing, from which point a rack 30 is suspended to engage a pinion 31 upon the shaft 32 of the dial hands 33—33. Anti-friction rollers 34—35 are mounted within the casing for the purpose of holding the rack rod and rack respectively in position.

I claim:

1. In a weighing scale, a rotary drum chart, a pinion on the shaft thereof, a dial indicator including a pivoted indicating hand, a pinion on the journal thereof, said drum and dial indicator being mounted one above the other, a movable element of the scale, and a single rack bar operated thereby and carrying vertically-spaced racks engaging respectively said pinions.

2. In a weighing scale, a rotary drum chart, a dial indicator comprising a pivoted indicating hand, said dial indicator and rotary drum chart being mounted one above the other, a movable element of the scale, a rack bar connected thereto, a pinion on the drum shaft with which said rack bar engages to rotate the drum, a pinion on the pivoted indicating hand, and a rack depending from the rack bar and meshing therewith, said pinions being substantially in the same vertical line but with their axes perpendicular to each other.

3. In a weighing scale, a rotary drum chart, a dial indicator comprising a pivoted hand, pinions on the shaft of the drum and journal of the indicator hand respectively, substantially in the same vertical line but with axes perpendicular to each other, a rack-rod connected to a movable part of the scale and offset to one side of the pinion of the dial indicator hand, and a rack depending from said rack-rod and engaging the pinion of the indicator hand.

4. In a weighing scale, a rotary drum chart, a dial indicator including a pivoted dial hand, a pinion on the shaft of the rotary drum chart, a pinion on the shaft of the indicator hand, said pinions being located substantially one above the other, but with their axes perpendicular to each other, a rack-rod meshing with the pinion on the shaft of the rotary drum chart and offset to avoid the pinion upon the shaft of the indicator hand and a rack depending from the rack-rod and engaging the pinion on the indicator hand shaft.

5. In a weighing scale, a rotary drum chart, a dial indicator including a pivoted dial hand, a pinion on the shaft of the rotary drum chart, a pinion on the shaft of the indicator hand, said pinions being located substantially one above the other, but with their axes perpendicular to each other, a rack rod meshing with the pinion on the shaft of the rotary drum chart and offset to avoid the pinion upon the shaft of the indicator hand and a pivoted rack depending from the rack rod and engaging the pinion on the indicator hand shaft.

6. In a weighing scale, and in combination with the load offsetting means thereof, a housing containing said load offsetting means, a casing supported thereby, a rotary drum chart within the casing, a pinion mounted on the shaft of the rotary drum chart, a dial mounted on the housing, a pivoted indicator hand coöperating therewith, a pinion upon the shaft of the indicator hand, a rack rod having a rack meshing with the pinion on the shaft of the drum chart and a rack secured to the rack-rod and engaging the pinion on the shaft of the indicator hand.

7. In a weighing scale, and in combination with the lever thereof, a housing, load offsetting means within the housing, a dial mounted in the housing, a pivoted indicator hand coöperating with the dial, a pinion on the shaft of said indicator hand, a rotary drum chart formed in two sections mounted above the housing, a pinion on the shaft of said chart, a rack rod connected to a movable part of the scale and having a rack meshing with said last-named pinion and a second rack depending from the rack-rod and meshing with the pinion on the shaft of the dial indicator hand.

8. In a weighing scale and in combination with the frame and load-offsetting means thereof, a scale beam fulcrumed on said frame, a dial indicator including a pivoted indicating hand, a rotary drum chart, said dial indicator and chart being arranged to rotate in planes at right angles to each other, a single vertically-reciprocating rod connected at its lower extremity to the scale beam, and separate means carried by the rod for rotating the indicating hand and the rotary chart, said means being arranged at right angles to each other.

LEWIS CALVIN WETZEL.

Witnesses:
CLARENCE W. FESSENDEN,
SAM G. CRANE.